United States Patent [19]

Heron

[11] Patent Number: 5,713,160
[45] Date of Patent: Feb. 3, 1998

[54] RETRACTABLE BIRD DETERRING DEVICE

[76] Inventor: Harold G. Heron, 280 Rochester Street, #2007, Ottawa, Ontario, Canada, K1R 7S4

[21] Appl. No.: 677,683

[22] Filed: Jul. 8, 1996

[51] Int. Cl.[6] .................................................. E04B 1/72
[52] U.S. Cl. .......................... 52/101; 52/25; 119/903; 256/11
[58] Field of Search ........................... 52/101, 24, 25; 119/903; 256/11, 12

[56] References Cited

U.S. PATENT DOCUMENTS

| 1,703,189 | 2/1929 | Getz | 256/11 |
|---|---|---|---|
| 3,771,767 | 11/1973 | Dougherty | 256/11 |
| 4,603,840 | 8/1986 | Simkin | 256/11 |
| 4,937,988 | 7/1990 | Gratton . | |
| 5,092,088 | 3/1992 | Way . | |
| 5,476,062 | 12/1995 | Ondris et al. . | |

FOREIGN PATENT DOCUMENTS

| 3820836 | 12/1989 | Germany . |
|---|---|---|
| 3913156 | 10/1990 | Germany . |
| 4005412 | 8/1991 | Germany . |
| 2237826 | 5/1991 | United Kingdom . |

*Primary Examiner*—Christopher Kent
*Attorney, Agent, or Firm*—Antonelli, Terry, Stout, & Kraus, LLP

[57] ABSTRACT

A retractable device for deterring birds from landing, roosting or nesting on a surface of a building structure, the device including at least two holding mechanisms each having a mounting member to be attached to the building structure and an arm for securing wire between the wire holding mechanisms, the arms being pivotally connected at respective pivots to the mounting members and being selectively pivotable to an operational protracted position in which the arms and wire lie above the surface of the building structure and to a non-operational retracted position in which the arms and wire lie below the surface of the building structure.

6 Claims, 3 Drawing Sheets

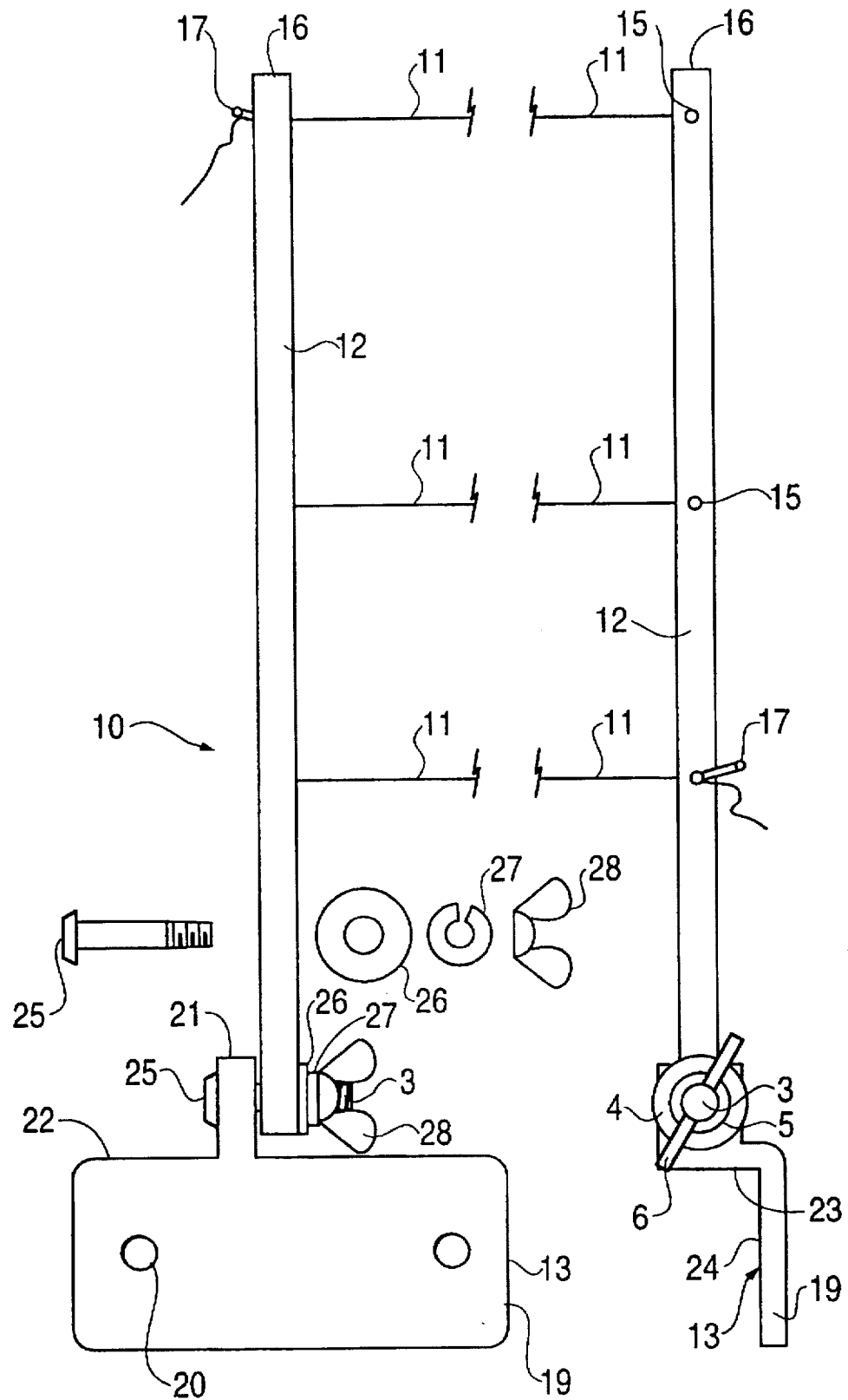

RETRACTABLE BIRD DETERRING DEVICE

BACKGROUND OF THE INVENTION

This invention relates to a device for deterring birds from roosting or nesting on building ledges or the like.

Overpopulation of birds causes stress, diseases, and crowded breeding places that are potentially dangerous to humans and domestic animals. Bird droppings create an unsightly, unhygienic mess that can damage buildings. People have been affected by pigeon-related parasitosis caused by pigeon ticks and red blood mites. A consequence of overpopulation is that birds are constantly looking for new places to roost and nest.

It is well known to use wires to discourage birds from roosting on buildings. For example, U.S. Pat. No. 5,092,088 describes a mechanism whereby wires are attached to structures mounted on a ledge. At one end of the mechanism, the wires are attached to a retracting mechanism that adjusts the length and tension of the wires.

UK published Patent Application no. 2,237,826 describes a removable bird deterring mechanism. More particularly, a support device for a wire consists of a cover that push-fits over metal support pins hammered into a building ledge. The cover along with the wire, can be separated from the pins to allow removal of the cover and wire from the building. The cover and wire have to be stored when removed from the pins. There is the possibility of the wire getting tangled or knotted during storage. Additionally, the support pins are permanently mounted on the top surface of the building from which they protrude.

SUMMARY OF THE INVENTION

An object of the present invention is to provide a bird deterring device which can be easily converted from an active mode in which it extends above a building surface to an inactive mode in which it is largely hidden from view.

According to one aspect, the present invention provides a wire holding mechanism for use in deterring birds from landing, roosting or nesting on a surface of a building structure, the wire holding mechanism comprising a mounting member to be attached to the building structure and an arm having spaced means for securing wire, the arm being pivotally connected at a pivot to the mounting member and being selectively pivotable to an operational protracted position in which the arm extends above the surface of the building structure and being selectively pivotable to a non-operational retracted position in which the arm lies below the surface of the building structure.

According to another aspect, the present invention provides a retractable device for deterring birds from landing, roosting or nesting on a surface of a building structure, the device comprising at least two holding mechanisms each comprising a mounting member to be attached to the building structure and an arm having spaced means for securing wire between the wire holding mechanisms, the arms being pivotally connected at respective pivots to the mounting members and being selectively pivotable to an operational protracted position in which the arms and wire lie above the surface of the building structure and to a non-operational retracted position in which the arms and wire lie below the surface of the building structure.

BRIEF DESCRIPTION OF THE DRAWINGS

FIG. 1 is a front view of one embodiment of a bird deterring device according to the invention;

FIG. 2 is a side view of the bird deterring device of FIG. 1;

DETAILED DESCRIPTION OF THE PREFERRED EMBODIMENTS

Figure 3:
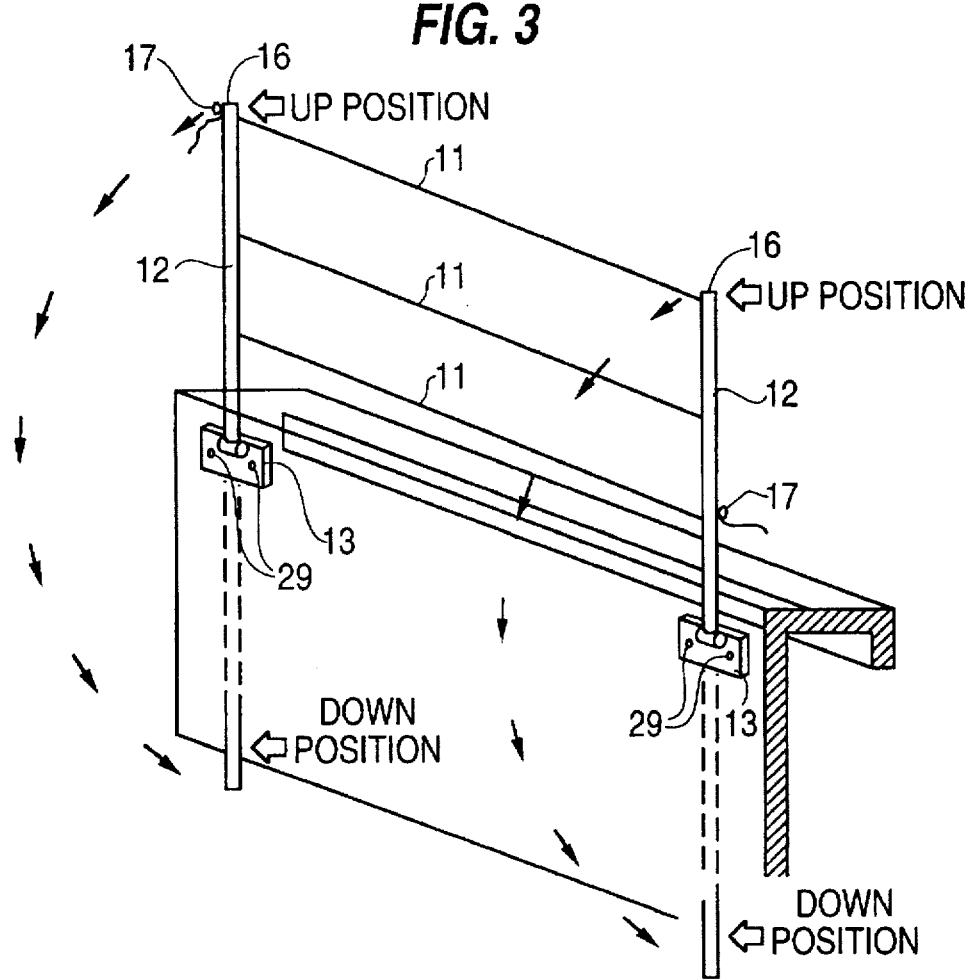
FIG. 3 is a perspective view of the bird deterring device shown mounted in position on a building ledge.

Referring to FIGS. 1 and 2, the bird deterring device comprises, in the illustrated embodiment, two or more wire holding mechanisms 10 between which lengths of wire 11 are strung. The wire holding mechanisms 10, only one of which is illustrated in FIGS. 1 and 2, are adapted to be secured to a building ledge.

Each wire holding mechanism 10 comprises an arm 12 pivotally connected, as will be described in detail below, to a base plate 13. The arm has three small through holes 15 provided at spaced locations along the arm with the top one being located close to the free end 16 of the arm. The holes 15 receive there through the wire 11 which is secured to the arm 12 by the pinching action of respective plugs 17 received through the holes 15. The plugs offer a simple means of adjusting wire tension that has been altered through expansion or contraction.

At the lower end each arm 12 is provided with a large through hole (hidden from view in FIGS. 1 and 2) designed for receipt of screw bolt 18.

The base plate 13 is formed of a generally rectangular flat plate portion 19, through which extend two spaced holes 20, and a protrusion 21 which is integrally connected to an upper edge portion 22 of the plate portion 19 at a location displaced from the center of the upper edge portion. The protrusion 21 is located entirely on one side of the plane in which the plate portion 19 lies and includes a surface 23 which meets one flat surface 24 of the plate portion at a right angle.

The protrusion also is provided with a large through hole (hidden from view in FIGS. 1 and 2) designed for receipt of the screw bolt 18.

The screw bolt 18 is received through the hole in the protrusion 21 and then through the large hole in the arm 12 with the head 25 of the screw bolt 18 butting the protrusion 21. A washer 26, lock washer 27 and wing nut 28 are then received in turn on the screw bolt. With the wing nut 28 loose the arm 12 may be pivoted to a position relative to the base plate 13 and with the wing nut tightened the arm 12 is maintained in the selected pivoted position.

Referring to FIG. 3, illustrated is a perspective view of the bird deterring device according to the invention when installed on the upstanding back surface of a balcony wall, i.e. the surface shown is that facing away from the balcony. Shown is the "up" position in full lines and the "down" position in phantom, the "down" position being positioned substantially 180° with respect to the "up" position. The arrows show the direction of movement of the arms 12 about their pivots when retracting the device from the "up" position to the "down" position. The device when in the "down" position is obscured from the view of someone on the balcony. Bolts 29 are received through the holes 20 (hidden from view in FIG. 3) in the rectangular flat portions 19 of the base plates 13 and are secured into the upstanding surface of a balcony wall, the bolts 29 holding the bird deterring device in place. A wire 11 is shown threaded through holes in the arms 12 and the wire is secured to each arm as described for FIGS. 1 and 2 above. It will be appreciated that the bird deterring device is of a small cross sectional area and hence will be "invisible" to the naked eye at a distance from the building. In addition, the device may be painted the same colour of the building wall to which it is attached to enhance the unobtrusive nature of the device.

Figure 4:
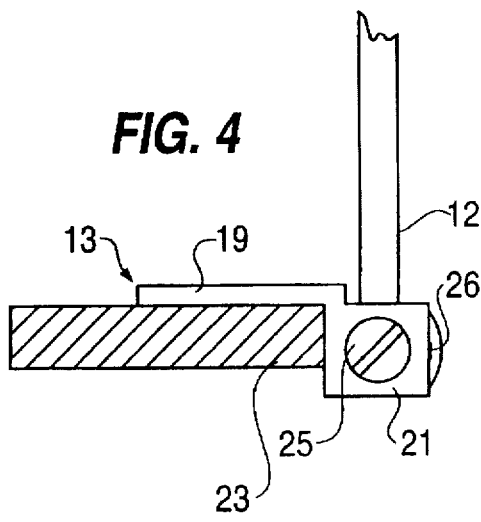
FIG. 4 is a side view of a portion of the bird deterring device illustrating a top mounting on a ledge.

Referring to FIG. 4, illustrated is one embodiment of a portion showing a top mounting on the sill of a balcony. The base plate 13 is shown with the flat plate portion 19 mounted essentially flush against a top surface of a sill. The flat surface 23 of the protrusion 21 rests essentially flush against the outside wall of the sill. The arm 12 may be released from its operational position shown and rotated away from the base plate to its non-operational position directly beneath the protrusion 21.

Figure 5:
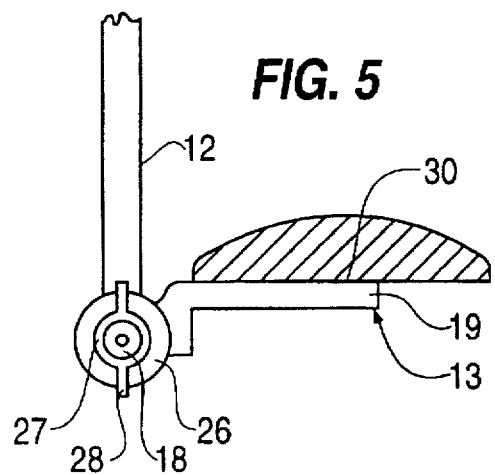
FIG. 5 is a side view similar to FIG. 4 but illustrating a bottom mounting on a ledge.

Referring to FIG. 5, illustrated is the plate portion 19 with its upper surface 30 mounted essentially flush on a bottom sill. The protrusion 21 juts out from the sill and the arm 12 extends vertically upwards in its operational position and may be rotated away from the base plate 13 to its non-operational position directly beneath the protrusion.

It will be appreciated that each arm 12 is selectively pivotable between four positions without the pivot end of the arm interfering with the base plate 13 or intersecting the plane of the base plate. The first and second of those positions are the "up" operational protracted position and the "down" non-operational retracted position shown in FIG. 3, in which the arm extends substantially parallel to the base plate. The third of those positions is the operational protracted position shown in FIGS. 4 and 5 in which the arm extends substantially perpendicular to the base plate. The fourth position is not shown but is the non-operational retracted position referred to in the description of FIGS. 4 and 5 in which the arm also extends substantially parallel to the base plate but in the opposite direction.

Figure 6:
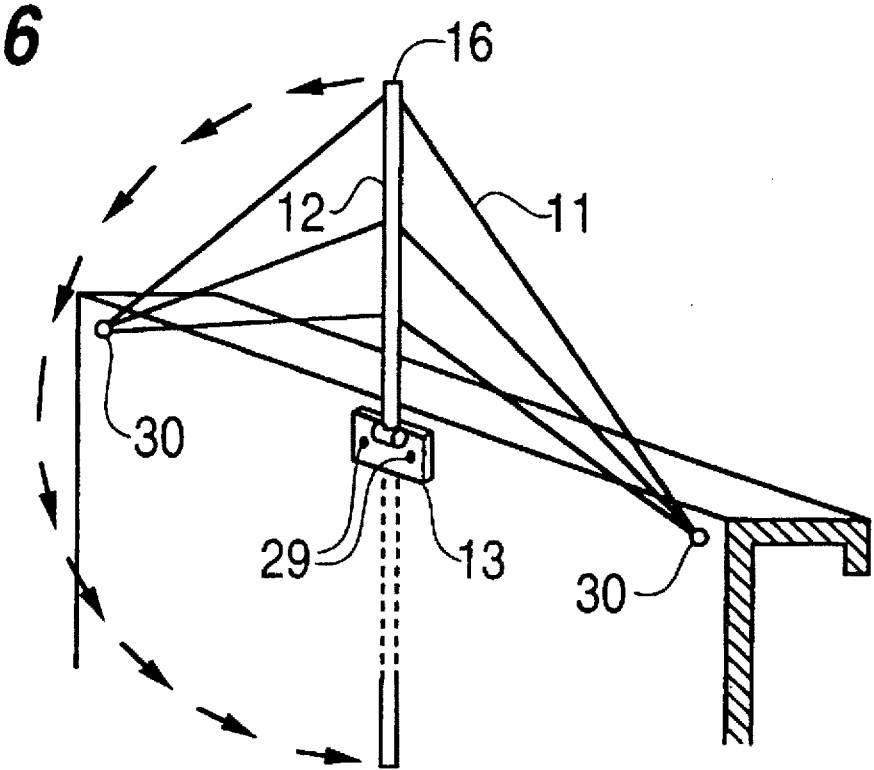
FIG. 6 is a perspective view of a single arm bird deterring device shown mounted in position on a building ledge.

Referring to FIG. 6, illustrated is a perspective view of a single arm bird deterring device according to the invention when installed on the back surface of a balcony wall, as described for FIG. 3. Shown is the "up" position in full lines and the "down" position in phantom. The base plate 13 is secured into an upstanding surface of a structure as described above. A wire 11 is shown threaded through holes in the arms 12 and the wire is secured to anchoring points 29.

The bird deterring device is maintained in position by tension on the hinge, controlled by torque, which is applied to the screw bolt 18 and wing nut 28. By releasing the tension on the hinge the bird deterring device is readily retracted to the "down" position as shown in FIG. 3.

It will be appreciated by an artisan that the hinge illustrated in FIGS. 1 and 2 may be replaced by a modified hinge, for example, a tension ratchet, quick release bolts and the like.

Although the above description refers to the use of bolts 29 for attachment of the base plate 13 to the building it should be appreciated that any conventional attachment means such as screws, nails, rivets or adhesive, etc., could be used instead.

According to a further aspect of the bird deterring device, more than two arms may be linked in sequence, wire being strung between the two or more arms. It will also be appreciated that although the FIGS. 1 and 2 show a wire threaded three times between the arms, the invention is not restricted to this embodiment. The invention allows for one or more wires to be linked in a suitable manner between two or more arms.

The plug 17 serves to hold the wire 11 in place by pinching the wire 11 against the wall of the hole 15. The mode in which the wire is attached to an arm is not at the essence of the invention. It will be appreciated that wire may be attached to an arm by many different methods, for example, by pinching between a screw and the arm, by glue, wedging between preformed nicks in the arms, etc. It will be appreciated that the wire 11 is also not at the essence of the invention and may be made of "fishing line" or another suitable material. While not being bound to any one form of commercialisation it is suggested that the invention may be sold in kit form wherein the purchaser would be responsible for additionally purchasing a suitable wire.

It is also within the scope of the invention for there to be a rigid linking member between two or more arms such that the mutual movement of two or more arms in unison into the up or down position is facilitated. The rigid linking member would be attached to the arms by conventional means.

I claim:

1. A wire holding mechanism for use in deterring birds from landing, roosting or nesting on a wall structure of a building, the wire holding mechanism comprising:

a base plate for attachment selectively to a horizontal surface or a vertical surface of the wall structure; and an arm having means for securing wire, wherein the base plate lies in a plane and has a protrusion integrally connected to an edge of the base plate and being located entirely on one side of the base plate, the arm having a first end pivotally connected to the protrusion and the arm being selectively pivotable between four positions without the first end of the arm interfering with the base plate or intersecting the plane of the baseplate, the four positions being first and second opposed positions in which the arm extends substantially parallel to the base plate and third and fourth opposed positions in which the arm extends substantially perpendicularly to the base plate, whereby, with the base plate mounted on a vertical surface of the wall structure, the first position defines an operational protracted position in which the arm projects above the wall structure and the second position defines a non-operational retracted position in which the arm does not project above the wall structure and, with the base plate mounted on a horizontal surface of the wall structure, the third position defines an operational protracted position in which the arm projects above the wall structure and the fourth position defines a non-operational retracted position in which the arm does not project above the wall structure.

2. A wire holding mechanism according to claim 1, wherein the means for securing wire comprises spaced holes in the arm.

3. A wire holding mechanism according to claim 1, wherein the arm is pivotally connected to the protrusion by means of a bolt passing through respective holes in the arm and the protrusion and having a threaded end receiving a nut, whereby loosening of the nut permits pivoting of the arm and tightening of the nut maintains the arm in a pivoted position.

4. A wire holding mechanism according to claim 3, wherein the nut is a wing nut and further comprises a lock washer on the bolt.

5. A retractable device mounted on a horizontal or vertical surface of a wall structure of a building for deterring birds from landing, roosting or nesting on the wall structure, the retractable device comprising:
- at least two wire holding mechanisms mounted on the horizontal or vertical surface at spaced locations and wire strung between the two wire holding mechanisms, each wire holding mechanism comprising a base plate attached to the horizontal or vertical surface; and an arm having means for securing the wire,
- wherein the base plate has a protrusion integrally connected to an edge of the base plate and being located entirely on one side of the base plate, the arm being pivotally connected to the protrusion and being selectively pivotable between two mutually opposed positions without the arm interfering with the base plate or the wall structure, one of the two positions being an operational protracted position in which the arm projects above the wall structure and the other of the two positions being a non-operational retracted position in which the arm does not project above the wall structure.

6. A retractable device according to claim 5, wherein the means for securing the wire comprises spaced holes in the arm of each wire holding mechanism.

* * * * *